H. L. SMITH.
WEATHER STRIP.
APPLICATION FILED SEPT. 24, 1919.
1,356,229.
Patented Oct. 19, 1920.
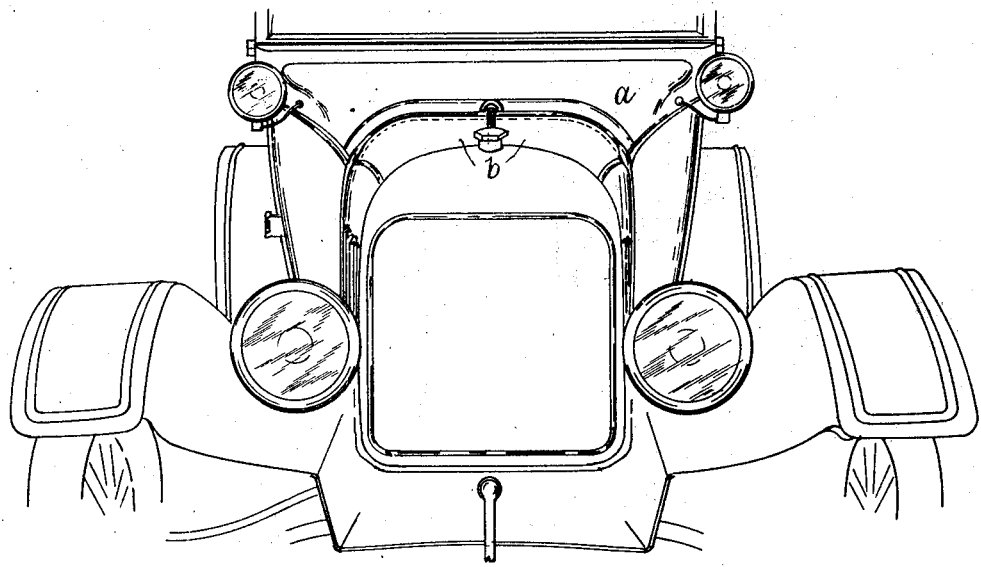
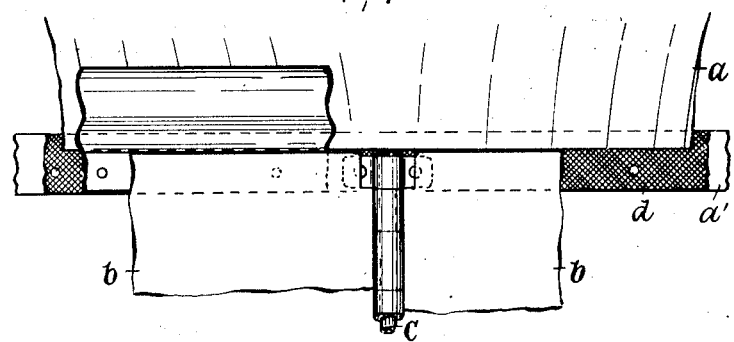
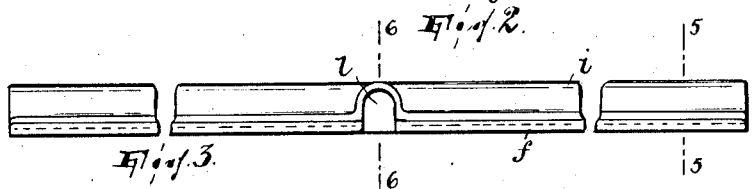
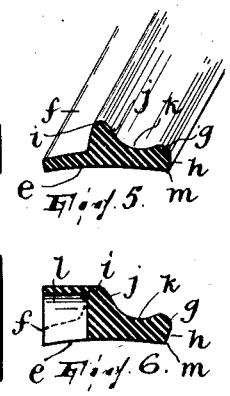
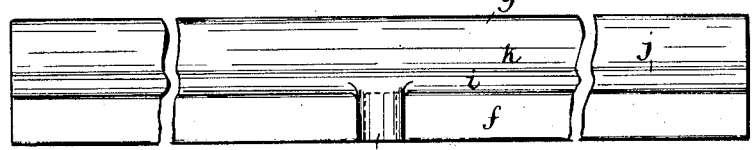
WITNESS
INVENTOR,
H. Lund Smith,
BY
ATTORNEY

UNITED STATES PATENT OFFICE.

HENRY LUND SMITH, OF PATERSON, NEW JERSEY.

WEATHER-STRIP.

1,356,229.   Specification of Letters Patent.   Patented Oct. 19, 1920.

Application filed September 24, 1919. Serial No. 325,989.

*To all whom it may concern:*

Be it known that I, HENRY LUND SMITH, a citizen of the United States, residing at Paterson, in the county of Passaic and State of New Jersey, have invented certain new and useful Improvements in Weather-Strips, of which the following is a specification.

This invention consists in a novel weather strip to be used at the joint between the forward part of the cowl and hinged members of the hood of an automobile, particularly where, as in the case of the Ford automobile, there are parts under the hood, such as the ignition box for the engine, which should be protected from rain or melting snow that finds its way into the hood through the joint mentioned. The automobile is usually provided with a piece of fabric forming a weather strip and permanently secured to the cowl so as to underlie the rear edges of the hood members, but if, as is usually the case, said members are or become warped or bent so that they do not conform to the shape of the part of the cowl which has the weather strip a crevice or crevices will exist which allow the water which runs down the sloping portion of the cowl to find its way into the hood. The device constituting this invention prevents water from finding its way into the hood not only because the weather strip has a lip which projects between the edges of the hood members and the cowl, acting somewhat in the same way as the permanent weather strip but to better effect, but because the improved weather strip has an exterior portion so shaped as to adhere snugly to the cowl back of the joint and afford a barrier or barriers that check the water running down the forward slope of the cowl and divert it sidewise.

In the drawing,

Figure 1 is a front elevation of a Ford automobile having the improved weather strip;

Fig. 2 is a plan of fragments of the cowl, hood members and improved weather strip;

Fig. 3 is a front elevation and Fig. 4 a plan view of the weather strip;

Figs. 5 and 6 are transverse sections on the lines 5—5 and 6—6, respectively, of Fig. 3; and Figs. 7 and 8 are sectional views on said lines 5—5 and 6—6, respectively, showing the device in place.

$a$ designates the forward sloping cowl and $b$ $b$ the hood members connected by the hinge rod $c$, of a Ford automobile, said hood members overlapping the forward or depressed portion $a'$ of the cowl, which has a permanent fabric weather strip $d$ affixed thereto, all in the usual manner.

Describing the preferred form of the improved weather strip, shown in the drawing, a suitable length of flexible material, such as rubber, is utilized, and this has one face $e$, which forms the base of the weather strip, arched. One edge portion $f$ of this strip (the two edges of the strip are preferably straight and parallel) is formed as a thin lip from end to end thereof. The other edge portion, $g$, is preferably somewhat thicker than the edge portion $f$, and its face $h$ forms a precipitous barrier. Between the two edges of the strip is arranged an upstanding rib $i$ which extends from end to end of the strip and forms at its face $j$ another barrier. The material of the strip from and including the rib $i$ to the face $h$ is appreciably thicker than the edge portion $e$ and forms the body portion of the strip, the same extending from end to end thereof. Between the edge portion $g$ and the rib $i$ there preferably exists a canal $k$ which extends from end to end of the strip.

In molding the strip, I preferably provide centrally of the length thereof and over the lip $f$ an integral arched housing $l$ open forwardly and downwardly only.

In applying the device to automobiles, the housing $l$ is fitted over the rear projecting end of the hinge rod $c$, the weather strip being so placed that the lip $f$ thereof will overlie the depressed portion $a'$ of the cowl, the hood members $b$ being at this time raised; the rear edge $m$ of the strip will then lie in contact with and more or less conform to the shape of the cowl back of its depressed portion $a'$, and as yet will remain arched in cross-section more or less as it appears in Figs. 5 and 6. When the cover members are lowered and secured down, the lip $f$ will be squeezed between them and the depressed portion $a'$ of the cowl, and the pressure of the cover members will act to alter the transverse shape of the weather strip so that instead of being concave on its under side as shown in Figs. 5 and 6 it will become convex, the result of which will be to cause the edge $m$ from end to end thereof to hug closely the cowl, so that the face $h$ becomes an effective barrier against the passage of water forward down the cowl and under the weather strip, and such water is diverted and flows off laterally at right angles. Any water that flows over the barrier or that falls on the weather strip is stopped by the barrier *i* and runs laterally down the canal *k*.

Having thus fully described my invention, what I claim as new and desire to secure by Letters Patent is:—

1. In combination, with the transversely arched cowl and hood of an automobile, the cowl being sloped downwardly toward the hood and the hood overlapping the cowl, of a length of flexible material having one longitudinal edge portion relatively thin and interposed between the cowl and the portion of the hood overlapping the cowl and having a longitudinal canal formed on its top surface between said edge portion and the opposite edge of the strip.

2. In combination, with the transversely arched cowl and hood of an automobile, the cowl being sloped downwardly toward the hood and the hood overlapping the cowl, of a length of flexible material having one longitudinal edge portion relatively thin and interposed between the cowl and the portion of the hood overlapping the cowl and having a longitudinal canal formed on its top surface between said edge portion and the opposite edge of the strip and said opposite edge portion formed as a precipitous face.

In testimony whereof I affix my signature.

H. LUND SMITH.